E. H. COVEL.
PROCESS AND APPARATUS FOR MANUFACTURING ILLUMINATING GAS.
No. 6,878. Reissued Jan. 25, 1876.
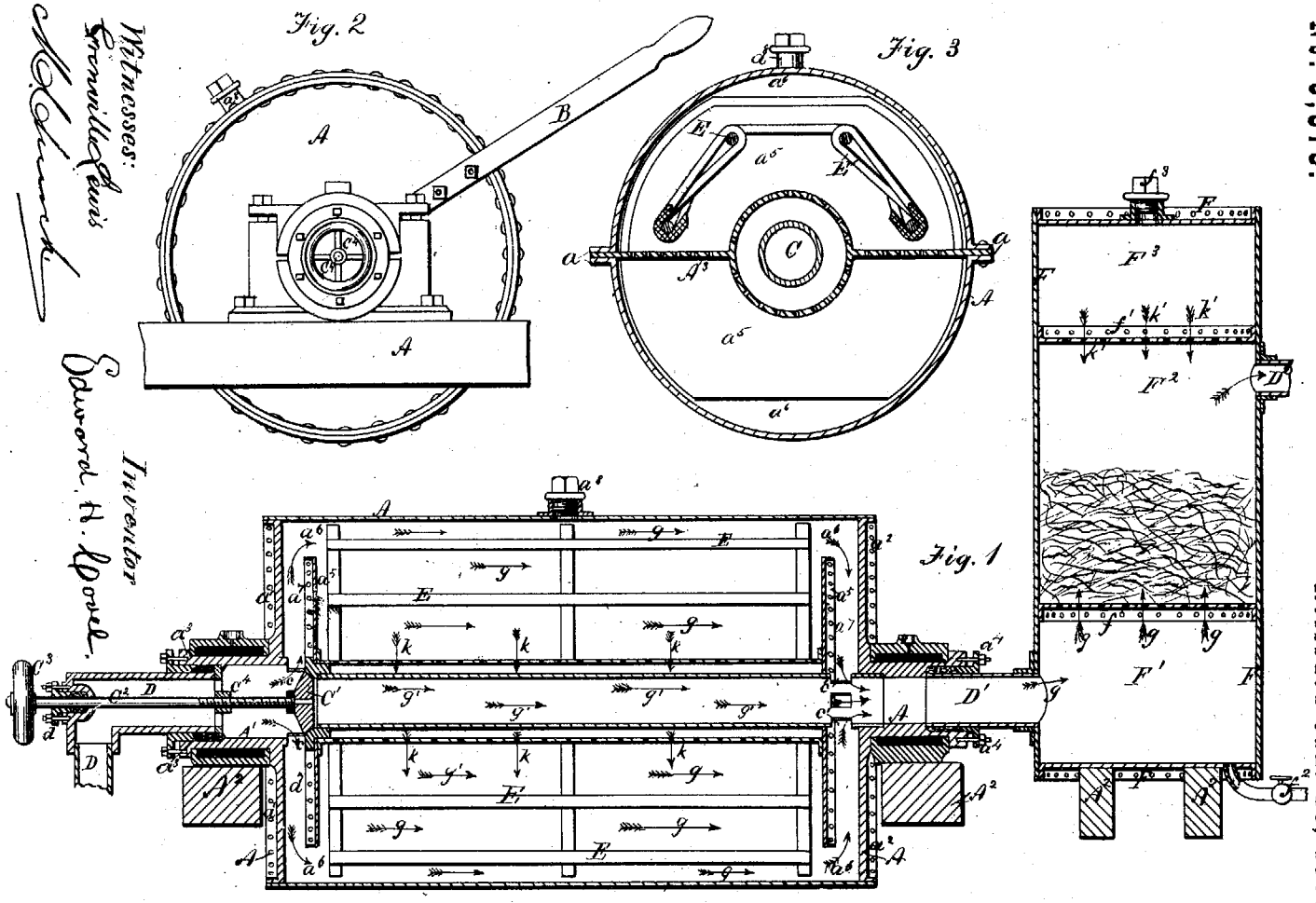
Witnesses:
Granville Lewis
M. Dunck
Inventor
Edward H. Covel.

UNITED STATES PATENT OFFICE

EDWARD H. COVEL, OF NEW YORK, N. Y.

IMPROVEMENT IN PROCESSES AND APPARATUS FOR MANUFACTURING ILLUMINATING-GAS.

Specification forming part of Letters Patent No. 169,423, dated November 2, 1875; reissue No. 6,878, dated January 25, 1876; application filed January 20, 1876.

*To all whom it may concern:*

Be it known that I, EDWARD H. COVEL, of the city of New York, in the county of New York and State of New York, have invented certain new and useful Improvements in the Process and Apparatus for the Manufacture of Illuminating-Gas; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 is a sectional elevation of the improved apparatus. Fig. 2 is an end elevation of the rotating carbonizing-chamber. Fig. 3 is a central transverse sectional elevation of the rotating chamber.

The invention consists in an apparatus in which the light and heavy fluid hydrocarbons are used simultaneously, rotating at intervals the chamber in which they are contained, thereby causing a uniform carbonization, or nearly so, of the gas or air passing the machine, and utilizing all of the hydrocarbon.

The gas or air, after leaving the rotary chamber, passes through another chamber, which may be used as a mixer or carbonizer, or both, at pleasure.

The degree of carbonization may be regulated, at the will of the operator, by means of an adjustable valve, which, in its different positions, will cause the whole or only a part of the gas or air passing through the machine to pass through the rotary carbonizing-chamber.

The invention also consists in passing the mechanical mixture of air or gas, and the vapor of a fluid hydrocarbon of a determined and definite photometric value, into a fixing-retort, where it is made permanent illuminating-gas.

The invention will be readily understood by reference to the accompanying drawings and the detailed description set forth in this specification.

The rotary chamber A is a cylindrical vessel, constructed of sheet metal, except, probably, its ends, which may be made cast-iron.

On each of its ends, and concentric with the cylinder, is a hollow trunnion, $A^1$, which rests on the timbering or other fixed supports $A^2$. One or more levers, B, are secured to either or both ends of the cylinder, for the purpose of turning it over a half-revolution on its trunnions.

The vessel A is built of two half-cylinders, as shown in Fig. 3, each half-cylinder having an externally-projecting flange, *a*, by means of which the two semi-cylinders are bolted together, so as to form a firm air or gas tight joint. Screw-bolts should be used for this purpose, as it may be necessary to take the vessel apart at intervals, for the purpose of cleaning or repairs.

Between the two flanges *a*, as above described, there may be introduced the edges of the diaphragm $A^3$, which divides the chamber A into two equal, or nearly equal, compartments.

The bolts which hold the two flanges *a* together will also pass through the diaphragm and hold it in position.

The diaphragm $A^3$ is divided into two parts in the center of the vessel, so as to form a small cylinder concentric with the vessel A, and through the center of the cylinder thus formed the regulating gas or air pipe *c* will be placed, so as to leave an annular opening between the pipe and the cylindrical part of the diaphragm, as shown in Figs. 1 and 3.

The ends of the gas-pipe C are joined with the ends or heads of the cylinder A, and open ports *c* in the sides of the said pipe, just inside of the front head $a^1$, permit the incoming gas to pass into the chamber A as required, and the gas so passed into the carbureting-chamber returns to the pipe C again through the open ports *c'*, which are located at the other end of the chamber A, just inside of the head $a^2$. The diaphragm $A^3$ is to be finely perforated throughout its entire extent within the chamber A, both in its flat and in its cylindrical part.

The induction gas-pipe D is connected with the hollow trunnion on the front end of the cylinder A by means of the stuffing-box $a^3$, and the connecting gas-pipe $D^1$ is attached to the other end of the rotary carbonizer by the stuffing-box $a^4$.

By this arrangement the gas to be carbonized may be conducted into and out of the rotary carbonizer without leakage, and the chamber A be at the same time left free to turn on its axis. Whether the chamber A is allowed to make a complete rotation around its axis, or only a semi-rotation or rocking motion, it is entirely immaterial, and will depend upon the arrangement of the lever B, which may permit a whole rotation or not.

At the front end of the machine is a valve, $C^1$, which is arranged to close the front end of the pipe C, on which the said valve is seated, as shown in Fig. 1.

This valve may be opened or closed, or adjusted to suit, by means of the valve-rod $C^2$ and the operating-wheel $C^3$, which wheel is in an accessible position outside of the apparatus.

The rod $C^2$ passes through the stuffing-box *d* on the induction-pipe D, and inside of the said pipe it is threaded, so as to engage the nut $C^4$, which is fixed inside of the said pipe, or the hollow trunnion on that end of the apparatus.

Just inside of the two heads of the chamber A are placed two diaphragms, $a^5$, which close down tightly to the pipe C, and also to the cylindrical sides of A, except in the small port-spaces $a^6$. (Shown in Figs. 1 and 3.) The spaces $a^7$, between the diaphragms $a^5$ and the ends of the chamber A, are sufficiently large to accommodate the flow of gas through the apparatus, and are in open communication with the ports *c c'* of the pipe C.

Within each of the compartments of A is placed a frame-work, E, as shown in Figs. 1 and 3, and between the ribs of this frame-work are stretched wires, cords, or other suitable appliances, as represented by E' in Fig. 3. These obstructions are made of either wood or iron, and are important to divide the currents of air or gas into small portions, so as to effectually secure the perfect carbonization of the gas, and every part of it, as it passes through the machine, which will more fully appear in the description of the process.

The connecting-pipe $D^1$ connects the cylinder A with a secondary chamber, F, which is divided into three compartments, $F^1$ $F^2$ $F^3$, by the perforated diaphragms *f f'*. The pipe $D^1$ leads into $F^1$, the lowest of these compartments, a short distance below the lower diaphragm *f*, and a sufficient distance above the bottom of F to form a basin for the drippings, which may be drawn off through the waste-cock $f^2$.

The middle compartment $F^2$ is partially filled with branches of trees, shavings, or some other suitable material, for stripping off from the gas any globules of fluid or other impurities that may have been carried mechanically with it from A, and this material will also act as a stationary mixer to give uniformity to the gas produced. The upper compartment $F^3$ is used as a reservoir to hold a hydrocarbon fluid to add to the carbonization in case the carbonization in vessel A should at times prove insufficient.

It must be borne in mind that the gas is frequently delivered to the carbonizer A in large quantities in a given space of time, and must receive its proper amount of carbon, or remain uncarbonized.

It is to meet this necessity that I employ an additional means by the use of reservoir $F^3$, that all the gas in either small or large quantities may be carbonized on its way to the heated retort.

The eduction-pipe $D^2$ leads out from the upper part of chamber $F^2$, and conveys the carbonized gas or air to the holder direct, or first through a heated retort, and thence through an ordinary gas-purifier, provided with the proper purifying materials, and thence through a condenser to the distributing-holder, so as to render the gas permanent; or the heated retort may be omitted, and also the holder, and the gas or air be passed directly to the burners, as may be found most desirable.

The man-hole plugs $a^8$ and $f^3$ are used to fill the chambers A and F with some fluid hydrocarbon.

In the apparatus constructed as above described, the process is as follows: A sufficient quantity of fluid hydrocarbon (the quantity varying, of course, with the size of the apparatus, but usually several barrels) will be put in the chamber A through its man-hole $a^8$, and the fluid so introduced will pass through the perforations of the diaphragm in the direction of the arrows *k*, and will fall into the lower half of cylinder A in a fine mist, spray, or shower, this operation being continued until all of the fluid shall have passed below the diaphragm, and then the cylinder will be given a half-revolution by means of the lever B, when the fluid will again pass through the diaphragm, as before, and so on. This spray or shower yields a very large amount of carbon vapor, evolved with great rapidity, and mingles with the passing gas, and every part of it with remarkable facility and in great abundance, holding the vapor and the fluid at about the same specific gravity throughout the entire operation, and using up the full amount of fluid hydrocarbon placed in the carbureter. This operation of turning the cylinder will be repeated throughout the process until the fluid shall have been exhausted.

If care be taken by not allowing any impurities to pass into the carbureter with the fluid carbon in the act of charging the carbureter, there will be no occasion to clean the carbureter, as it will remain in action a long time without any attention in that respect.

By the alternate filling of both the upper and lower compartments of A, as above described, all of the obstructions E' will, at intervals, become submerged in the fluid, and be thereby saturated with the heavier parts of the hydrocarbon, and by the alternate filling of each of the compartments, as described, all of the light and heavy parts of the hydrocarbon will be subject to simultaneous combination with the gas passing through the machine, and there will, therefore, be no waste or residuum, but the gas will receive the amount of carbon vapor intended for it at about the same specific gravity at all times.

The hydrocarbon being placed in A and agitated, as above described, the air, hydrogen, or other gas to be carbureted will be turned on through the pipe D in the direction of the arrows *g*.

The gas will pass through the ports *c*, thence through the passages $a^7$ and the openings $a^6$ at sides of diaphragm $a^5$, and thence through both of the chambers of A, until the lower opening $a^6$ shall have become sealed by the fluid rising to the edge of the diaphragm $a^5$, after which it will only pass through the upper compartments until the machine shall have been again turned over. After passing through the compartments of A the gas-currents *g* will pass through the openings $a^6$, passages $a^7$, and open ports *c'* at the back end of the machine, and so on into the pipe $D^1$, and thence to the chamber $F^1$ of the secondary apparatus.

The gas will pass from the compartment $F^1$ in the direction of the currents *g*, up through the perforations of diaphragm *f*, and through the obstructions of the chamber $F^2$, and out of said chamber through pipe $D^2$, which will conduct it to the fixing-retorts, holders, or burners, as may be found most desirable, and by the usual pipes, conductors, and connections employed in lighting buildings.

In passing through the chambers of A the air or gas will take up from the shower through which it passes, and from contact with the saturated obstruction or channels of E', (the gas or air having been divided, in its passage, into very small portions by the action of the partition-channels or obstructions,) a very large amount of hydrocarbon vapor, thereby charging the entire body of gas or air with the atoms of the hydrocarbon, and allowing no part of the gas or air to escape without becoming carbonized to a high degree.

The gas having now become highly charged with the vapor of hydrocarbon—and it may happen too largely for practical use without making a smoky light—it is very important to control or regulate the amount of vapor to be delivered to the air or gas that the final mixture shall be of about the candle-power desired.

In order to properly and effectually regulate the carbonization of the gas or air I introduce the gas-regulating pipe C, which will, on the opening of the valve $C^1$, admit the uncarbureted air or gas in a current, (represented by the arrows *g'*.) The gas or air will enter the pipe C, and naturally pass through said pipe with greater ease and rapidity than around through the chamber A under a given pressure. This uncarbureted current *g'* will mingle with the carbureted current *g* in the pipe $D^1$ and chamber $F^1$, where the different gases and vapor will blend together and pass on together into the chamber $F^2$, which will act as a mixer, and the gases and vapor so combined may easily be rendered of a uniform quality at the pleasure of the operator, and of any photometric standard required, by simply adjusting the valve $C^1$ as may be desired from time to time.

A test-burner or photometer may be used for showing the candle-power of the mixture before it enters the heated retort.

The mixture, in passing through the obstructions in the chamber $F^2$, will be stripped of any globules of fluid or mechanical impurities that it may have become charged with in passing through A, and these fluid strippings will fall into the bottom of the air-chamber $F^1$, whence they may be drawn off through the cock $f^2$.

In case the carbonization in the chamber A shall not at any time be sufficient, the auxiliary chamber $F^3$ is provided, which, when used, will be filled with a fluid hydrocarbon, which will pass through its perforated bottom $f^1$ in the direction of the arrows *k'*, and fall in a shower upon the obstructions in $F^2$, and the gas passing through the said chamber will thereby be carbonized to a very high degree.

In lieu of the mixing and carbureting chamber $F^2$, what is known in the art as a "gas-mixer" may be used, as the principal object of this chamber is to thoroughly mix the air or gas with the vapor of a hydrocarbon fluid, and render the mixture produced of a homogeneous character.

The mixer spoken of is of the character of a revolving exhauster. A McKenzie blower or exhauster will answer the purpose. Neither the mixing and carbureting chamber F, nor any other mixer, need be used under certain circumstances, for there are cases where the rotary carbonizer A will be all that will be required, and the regulating-valve $C^1$ may be so adjusted as to produce a sufficiently homogeneous gas for all necessary purposes in certain uses. Neither will it be necessary always to send the gas carbonized in this machine to a fixing-retort, as the carbureted gas passing this machine in certain localities may be used as a mechanical mixture. It may be found, also, that in certain localities it will be necessary to heat, to a moderate degree, the carbonizer, or the air or the gas sent into it; and when such is required the carbonizer may be heated by means of a steam-jacket placed around the apparatus, or steam-pipes may pass through it, the object being simply to overcome the cold produced by the rapid evaporation of the fluid hydrocarbon, which cold has a tendency to retard the carbonization of the gas.

The gas or air may be heated by any of the ordinary means employed for such purpose.

The heated retorts referred to may be arranged in a satisfactory manner, so as to effectually fix the mixture of gas and vapor, and render it strictly permanent, by partially filling the retort with brick, so arranged on the inside of the retort as to allow the gas to pass around and between the heated bricks, and thus secure the object sought.

A chambered retort may be used for this purpose, or pipes, channels, or other similar apparatus placed in the retort may be employed.

Having described my process and apparatus, what I claim as my invention, and desire to secure by Letters Patent, is—

1. In the manufacture of illuminating-gas, the process of producing a mechanical mixture of water-gas and the vapor of a fluid hydrocarbon, which consists in passing the water-gas, in regulated quantities, through a constant shower of liquid hydrocarbon, maintained at about the same specific gravity, and then diluting it, or not, with regulated quantities of uncarbureted gas or air, and then thoroughly mixing the same and determining the photometric value of the mixture, substantially as described.

2. The process of manufacturing a permanent illuminating-gas from non-illuminating gases and the vapor of a fluid hydrocarbon, which consists in passing the non-illuminating gases, in a regulated flow, through a shower of fluid hydrocarbon, and then subjecting this mixture, under regulated pressure, to a fixing-heat, as set forth.

3. The method of preventing stratification in illuminating-gas, which consists in forming a mechanical mixture of non-illuminating gas or gases and the vapor of a fluid hydrocarbon, which mixture shall have a uniform specific gravity and a definite photometric value, by first passing a regulated flow of the non-illuminating gas or gases through a constant shower of liquid hydrocarbon, or, if desired, into a mixture of gases and vapors so formed, uniformly mixing the gases or vapors, and maintaining that uniformity, and, finally, subjecting the mixture to a fixing-heat, whereby a permanent gas of a uniform gravity and luminosity is made, substantially as set forth.

4. A reversible carbureter, which maintains a constant flow and shower of the carbureting material, as and for the purpose described.

5. The reversible carbureter A, constructed with a diaphragm, $A^3$, passing through its diameter, and hung in hollow trunnions $A^1$, so that it may be reversed when the hydrocarbon fluid has passed from the upper to the lower section, bringing the fluid in position to again pass through the diaphragm, substantially as set forth.

6. The regulating gas-pipe C, arranged concentrically with the carbureter A, substantially as and for the purpose set forth.

7. The combination of the valve $C^1$ with the diluting air or gas pipe C, arranged substantially as described, and for the purpose set forth.

8. In a reversible carbureter, the combination of a perforated diaphragm, a diluting-pipe, and regulating-valve, as and for the purpose described.

9. A reversible carbureter, provided with a perforated diaphragm, a diluting-pipe, and regulating-valve, in combination with a mixer, as and for the purpose described.

10. The carbonization and arrangement of the carbureter A and the dripping and mixing chambers $F^1$ $F^2$, substantially as and for the purpose set forth.

11. The auxiliary carbonizing and mixing apparatus, consisting of the chambers $F^2$ $F^3$, in combination with the rotary carbonizer A, substantially as set forth.

In testimony that I claim the foregoing I have hereunto set my hand this 20th day of January, 1876.

EDWARD H. COVEL.

Witnesses:
ABRAHAM MOORE,
S. M. POOL.